Figure 1:
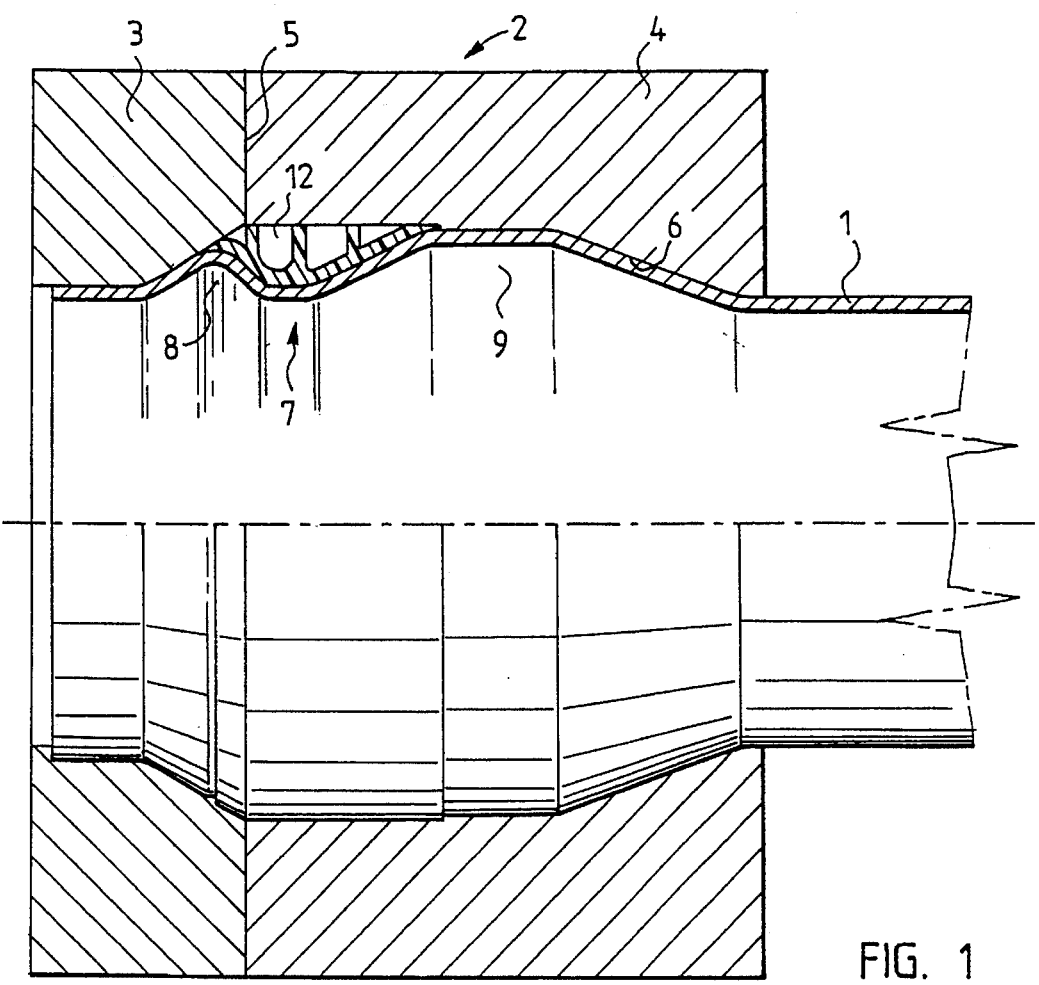

US005601776A

United States Patent [19]
Tuominen

[11] Patent Number: 5,601,776
[45] Date of Patent: Feb. 11, 1997

[54] METHOD AND A MOULD FOR FORMING AN EXPANSION, SUCH AS A SOCKET, IN A PIPE, AND A PLASTIC PIPE

[75] Inventor: Ari Tuominen, Villähde, Finland

[73] Assignee: Uponor Innovation AB, Fristad, Sweden

[21] Appl. No.: 302,516

[22] Filed: Sep. 8, 1994

[30] Foreign Application Priority Data

Nov. 2, 1993 [FI] Finland .................................. 934848

[51] Int. Cl.⁶ .................................................. B29C 49/20
[52] U.S. Cl. ............................................ 264/516; 425/503
[58] Field of Search .................................. 264/515, 516, 264/535, 512, 573, 296, 506, 507; 425/387.1, 393, 503, 504

[56] References Cited

U.S. PATENT DOCUMENTS 3,540,759 11/1970 Schneider.
3,982,871 9/1976 Moddel .................................. 425/393
4,030,872 6/1977 Parmann .............................. 425/393
4,394,343 7/1983 Acda et al. ........................... 264/296

FOREIGN PATENT DOCUMENTS 68559    6/1985  Finland.
1924557  11/1970 Germany.
2112835  3/1971  Germany ............................. 264/506
400044   9/1978  Sweden.

Primary Examiner—Catherine Timm
Attorney, Agent, or Firm—Ladas & Parry

[57] ABSTRACT

The present invention relates to a method and a mould for forming an expansion, such as a socket, in a plastic pipe, and a plastic pipe. According to the method, the heated end of the pipe is placed in an external mould (2) and pressed against the mould surface (6) to form a socket. Two grooves (8, 9) can be formed in the socket by a simple method, using a mould ring (12) which is separate from the other parts (3, 4) of the mould and by means of which the grooves of the socket are formed. The ring is simultaneously locked into the socket (7), thereby functioning as a reinforcement ring.

4 Claims, 1 Drawing Sheet

METHOD AND A MOULD FOR FORMING AN EXPANSION, SUCH AS A SOCKET, IN A PIPE, AND A PLASTIC PIPE

The present invention relates to a method for forming an expansion, such as a socket, in a plastic pipe, wherein at least the pipe part to be formed as a socket is heated, said pipe part is placed in a mould having an inner mould surface and surrounding the pipe part, and internal pressure is applied to expand the pipe part against the mould surface, whereafter the pipe part is cooled and removed from the mould.

The invention also relates to a mould for forming an expansion and to a plastic pipe.

It is often necessary to make various expansions in plastic pipes manufactured by extrusion, for example. A typical expansion is a socket at the end of the pipe, which enables a socket joint between pipes. However, plastic pipes can also be provided with other local expansions, which are used for example for fastening, support or installation of the pipe. In order to simplify the description, the following will focus on manufacture of the most common expansion, the socket.

Plastic pipes are generally joined together by socket joints. In order to achieve sealing between the socket and the insertion portion, a groove is made in the inner surface of the socket, and a sealing ring is disposed in the groove and presses against the socket and the insertion portion.

In order to achieve axial locking particularly for pipelines that transport a pressurized fluid, two grooves have been formed in the pipe, axially in succession at a certain distance from each other, see e.g. U.S. Pat. No. 4 111 464 and UK Patent Application 2 166 508. In the sockets disclosed in these publications, one groove is for the sealing ring and the other for the locking ring. The locking is the most efficient if the locking ring is wedge-shaped, as disclosed in the above UK application.

Pipe sockets provided with two inner grooves are difficult to manufacture. This is the case particularly in the manufacture of molecule-oriented pipes for example in accordance with UK Patent 1 589 052. Herein the mould is a uniform cylinder being nearly equal in length to the pipe, and the pipe is removed from it by opening the end nearest the socket and by axially pulling the pipe from the mould. In this case the division surface of the parts of the external mould must be located at the outermost part of the socket. A mould intended for the manufacture of sockets with two grooves must be capable of expanding radially at least at the socket, which increases the costs considerably compared with a one-part mould.

For the above mentioned reason, the two-groove sockets of conventional pipes are usually manufactured in a separate step for example by extrusion and connected directly to the pipe by glueing or welding. For the above mentioned practical reasons, molecule-oriented pipes have not been provided with a locking groove.

It is an object of the present invention to provide a method for forming a socket with two or more grooves in a plastic pipe in a simpler way than before. The method according to the invention is characterized in that before the expansion of the pipe, the mould is complemented with a mould ring, whose surface facing the pipe forms at least a part of the mould surface, said ring being locked into the socket when the socket is formed and coming off with the socket when it is removed from the mould.

Owing to the method according to the invention, the mould body surrounding the pipe can be made in the conventional fashion from two one-part rings because the recess between the socket grooves (seen from outside the pipe) is achieved by a mould ring which is separate from the mould body and which remains on the socket in the space between the grooves. Besides simplifying the structure of the mould, the mould ring also strengthens the socket at the most critical region, i.e. at the wedge surface of the locking ring.

This invention also relates to a mould for forming an expansion, such as a socket, in a plastic pipe, the mould including a body which is intended to surround at least the part of the plastic pipe to be formed as a socket and which has an inner mould surface, against which the pipe part is to be pressed when the socket is formed.

The mould according to the invention is characterized in that the mould also includes a mould ring inside the mould body, whose surface facing the pipe forms at least a part of the mould surface, said ring being separate from the mould body so that it can come off with the socket when it is removed from the mould.

The invention also relates to a plastic pipe with one or more expansions, such as a socket, for joining, fastening or supporting the pipe. The plastic pipe according to the invention is characterized in that at least a part of the outer surface of the expansion is surrounded by a mould ring, which is locked in position during the formation of the socket.

The ring surrounding the expansion of the plastic pipe supports the expansion, in addition to which it has the above function in allowing easier manufacture.

Figure 2:
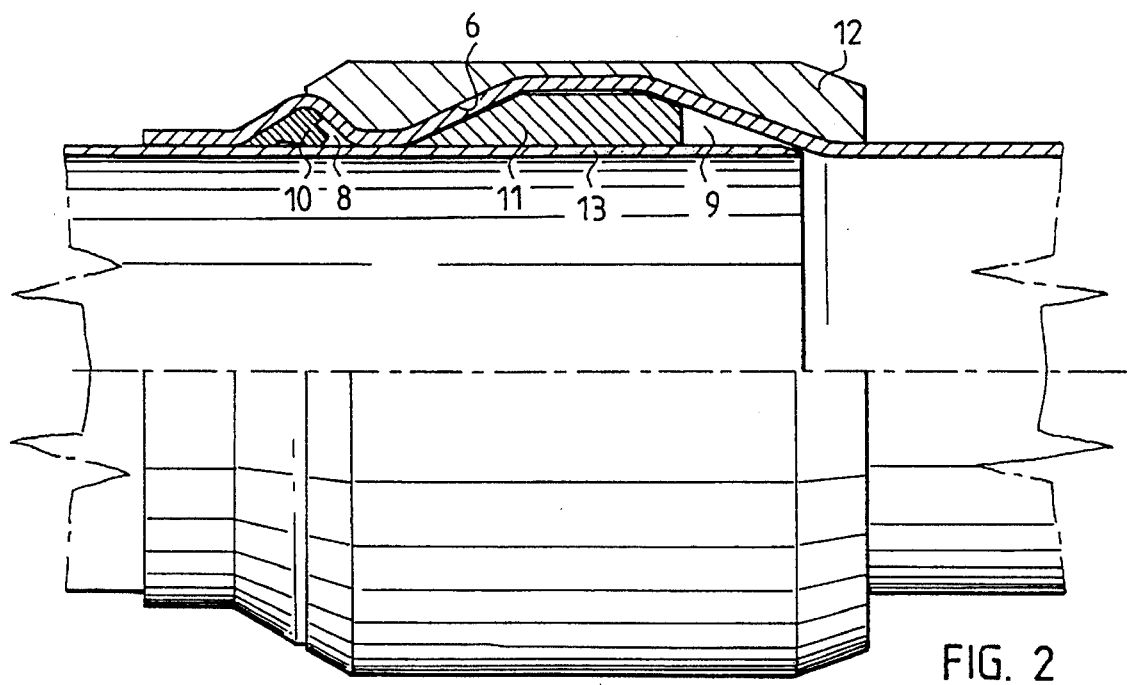

In the following the invention will be described in greater detail with reference to the accompanying drawing, in which FIG. 1 shows a first embodiment of the mould according to the invention while the socket is still inside the mould, and FIG. 2 shows another embodiment of the invention as a complete pipe joint.

FIG. 1 shows a plastic pipe 1, one end of which is placed inside a ring-shaped mould 2, which has an internal diameter for the most part larger than the external diameter of the pipe. The mould has a body consisting of axially successive parts 3 and 4, and the division surface between the parts is denoted by reference numeral 5. The inner surface of the mould 2 forms a mould surface 6, against which the pipe part to be formed as a socket 7 is pressed in order to form two grooves 8 and 9 in the socket. Groove 8 is for a sealing ring 10, and groove 9 for a wedge ring 11. The mould can also be longer than shown, so that also the straight part of the pipe is expanded against the mould, as disclosed in UK Patent Application 1 589 052.

According to the invention, the mould also includes a mould ring 12, which is located on the inner surface of the mould 2 and which is preferably a uniform ring of rigid plastic having small portions cut away from the outer surface. The mould ring thus functions as a part of the mould 2, although it is separate from the mould body 3, 4 against the inner surface of which the ring is pressed.

As shown in FIG. 1, the cross-section of the mould ring 12 is such that it forms a protrusion towards the centre line of the mould 2 on the mould surface 6 by means of a ridge in the ring. Thus the largest diameter of the sealing and locking grooves 8, 9 is larger than the inner diameter of the ridge in the mould ring 12 between the grooves.

The mould according to the invention functions in the following way. In order to form the socket 7 at the end of the plastic pipe 1, the mould ring 12 is placed inside the mould body 4 and the mould body 3 is positioned as shown in FIG. 1. After this, the end of plastic pipe 1 to be moulded as a socket 7 is heated to a suitable temperature and inserted into the mould 2. Then the heated end of the pipe is expanded by means of external subatmospheric pressure, pressurized liquid/gas fed into the pipe or by means of mechanical expansion devices not shown, until the wall of the pipe follows the mould surface 6 as shown in FIG. 1. When the deformation is completed, the socket is cooled, whereafter the mould body 3 is removed, and then also the pipe 1 with socket 7 and the mould ring 12 on the outer surface of the socket between the grooves 8 and 9 can be removed from the mould body 4. After this, the mould ring 12 also functions as a reinforcing ring on the socket.

FIG. 2 shows another embodiment of the mould ring 12. In this embodiment the mould ring extends entirely over the groove 9 in which the wedge ring 11 is to be located. The mould ring thus forms almost the entire mould surface 6. FIG. 2 shows how a male end 13 of a pipe is inserted into the socket 7, and also shows the sealing ring 10 and the wedge ring 11.

It is to be noted that the embodiments of the invention can vary within the scope of the attached claims. The invention is particularly suitable to be implemented in molecule orientation of an entire pipe by increasing its diameter. The shape of the mould ring can also vary according to need, and it can form the entire mould surface 6.

The pipe expansion described above can also be of another kind than a socket. It can be located at a distance from the end of the pipe, and the mould ring can have means for supporting or fastening the pipe, for example.

I claim:

1. In a method for forming an expansion in a plastic pipe in a mould provided with an inner mould surface and including a ring shaped mould body having only two axially successive parts relatively moveable in the axial direction of the said mould body for closing and opening said mould, the improvements comprising the steps of:

inserting a mould ring into said mould body, the surface of said mould ring forming at least a part of said inner mould surface;

closing said mould body;

heating at least the part of said pipe which is to be formed as an expansion;

placing said pipe part in said mould body;

applying an internal pressure inside said pipe part to expand the same against said inner mould surface and thereby form said expansion and to lock said mould ring to said expansion;

cooling said pipe part;

opening said mould body; and removing said pipe part from said mould together with said mould ring which is locked to said expansion.

2. In a method of expansion moulding a first groove (9) in a plastic pipe (1) in only first and second mould parts (3,4) that abut along division surfaces (5) that are generally perpendicular to a longitudinal axis of the plastic pipe (1), the improvement for forming in the plastic pipe (1) axially adjacent the first groove (9) a socket (7) having a diameter smaller than a diameter of the first groove (9), comprising:

providing a first portion of an inner mould surface (6) on the second mould part (4) having a first diameter for forming the first groove (9);

providing a second portion for the inner mould surface (6) on the second mould part (4) axially adjacent the first portion of the inner mould surface (6) and having a second diameter that is at least as large as the first diameter;

placing a mould ring (12) on the second portion of the inner mould surface (6) for defining the socket (7), wherein the mould division surfaces (5) abut in a plane intersecting the first or second portions for the inner mould surface (6);

expansion moulding the plastic pipe (1) against the mould ring (12) and the first portion of the inner mould surface (6); and separating the first and second mould parts at the division surfaces (5).

3. The method according to claim 2, and further comprising:

defining a second groove (8) having a third diameter intermediate the first and second diameters in the expansion moulded plastic pipe (1) with a portion of the mould ring (12).

4. The method according to claim 3, wherein the defining is further with an inner mould surface of the first mould part (3).

* * * * *